(12) United States Patent
Colombo et al.

(10) Patent No.: US 11,822,934 B2
(45) Date of Patent: *Nov. 21, 2023

(54) PROCESSING SYSTEM, RELATED INTEGRATED CIRCUIT, DEVICE AND METHOD

(71) Applicants: STMicroelectronics Application GMBH, Ascheim-Dornach (DE); STMICROELECTRONICS INTERNATIONAL N.V., Schiphol (NL)

(72) Inventors: Roberto Colombo, Munich (DE); Om Ranjan, New Delhi (IN)

(73) Assignees: STMicroelectronics Application GMBH, Aschheim-Dornach (DE); STMICROELECTRONICS INTERNATIONAL N.V., Germany Schiphol (NL)

( * ) Notice: Subject to any disclaimer, the term of this patent is extended or adjusted under 35 U.S.C. 154(b) by 40 days.

This patent is subject to a terminal disclaimer.

(21) Appl. No.: 17/341,054

(22) Filed: Jun. 7, 2021

(65) Prior Publication Data
US 2021/0294534 A1    Sep. 23, 2021

Related U.S. Application Data

(63) Continuation of application No. 16/273,704, filed on Feb. 12, 2019, now Pat. No. 11,048,525.

(30) Foreign Application Priority Data

Feb. 21, 2018    (IT) .................... 102018000002895

(51) Int. Cl.
*G06F 11/10*    (2006.01)
*G06F 9/445*    (2018.01)
(Continued)

(52) U.S. Cl.
CPC ...... *G06F 9/44505* (2013.01); *G06F 11/1004* (2013.01); *G06F 13/36* (2013.01); *H04L 9/0643* (2013.01); *H04L 9/3247* (2013.01)

(58) Field of Classification Search
CPC .. G06F 9/44505; G06F 11/1004; G06F 13/36; H04L 9/0643; H04L 9/3247
See application file for complete search history.

(56) References Cited

U.S. PATENT DOCUMENTS 5,781,793 A    7/1998    Larvoire et al.
5,835,925 A    11/1998    Kessler et al.
(Continued)

FOREIGN PATENT DOCUMENTS

IT    102018000001633 A1    7/2019

*Primary Examiner* — Aurel Prifti
(74) *Attorney, Agent, or Firm* — Slater Matsil, LLP

(57) ABSTRACT

A processing system includes a plurality of configuration data clients; each associated with a respective address and including a respective register, a hardware block, a non-volatile memory, and a hardware configuration circuit. A respective configuration data client receives a respective first configuration data and stores it in the respective register. The hardware block is coupled to at least one of the configuration data clients and changes operation as a function of the respective first configuration data stored in the respective registers. The non-volatile memory includes second configuration data stored as data packets including the respective first configuration data and an attribute field identifying the respective address of one of the configuration data clients. The hardware configuration circuit sequentially reads the data packets from the non-volatile memory and transmits the respective first configuration data to the respective configuration data client.

20 Claims, 7 Drawing Sheets

(51) Int. Cl.
　　*G06F 13/36*　　　(2006.01)
　　*H04L 9/06*　　　(2006.01)
　　*H04L 9/32*　　　(2006.01)

(56) References Cited

U.S. PATENT DOCUMENTS

| | | | |
|---|---|---|---|
| 6,466,972 B1* | 10/2002 | Paul | G06F 9/4416 |
| | | | 709/219 |
| 6,732,219 B1 | 5/2004 | Broyles | |
| 7,225,373 B1 | 5/2007 | Edwards et al. | |
| 8,022,724 B1 | 9/2011 | Jenkins, IV | |
| 8,943,236 B1 | 1/2015 | Usmani | |
| 9,128,798 B2 | 9/2015 | Hoffman et al. | |
| 9,367,298 B1 | 6/2016 | Eng et al. | |
| 9,542,350 B1* | 1/2017 | Kissell | G06F 13/14 |
| 9,652,210 B2 | 5/2017 | Suchy et al. | |
| 10,181,948 B1* | 1/2019 | Nenov | G06F 9/44505 |
| 10,203,967 B1* | 2/2019 | Atta | H04L 41/0813 |
| 10,404,833 B1* | 9/2019 | de Sales, Jr. | H04L 67/34 |
| 10,521,618 B1 | 12/2019 | Zhang et al. | |
| 10,713,063 B1* | 7/2020 | Wilczek | G06F 9/44505 |
| 10,754,723 B2 | 8/2020 | Colombo et al. | |
| 10,845,999 B2 | 11/2020 | Colombo | |
| 2004/0025086 A1 | 2/2004 | Gorday et al. | |
| 2004/0243691 A1 | 12/2004 | Viavant et al. | |
| 2006/0130033 A1 | 6/2006 | Stoffels et al. | |
| 2006/0224851 A1 | 10/2006 | Tamura et al. | |
| 2008/0229038 A1 | 9/2008 | Kimura et al. | |
| 2008/0291937 A1* | 11/2008 | Cheshire | H04L 47/624 |
| | | | 370/429 |
| 2009/0063865 A1 | 3/2009 | Berenbaum et al. | |
| 2010/0058327 A1* | 3/2010 | Dehaan | G06F 8/61 |
| | | | 717/176 |
| 2010/0180016 A1* | 7/2010 | Bugwadia | H04L 41/0886 |
| | | | 713/168 |
| 2010/0250907 A1* | 9/2010 | DeHaan | G06F 8/60 |
| | | | 713/1 |
| 2011/0191829 A1 | 8/2011 | Fischer et al. | |
| 2012/0197972 A1* | 8/2012 | Tukol | G06F 9/44505 |
| | | | 709/203 |
| 2012/0216012 A1 | 8/2012 | Vorbach et al. | |
| 2013/0185482 A1 | 7/2013 | Kim et al. | |
| 2013/0232246 A1 | 9/2013 | Miller et al. | |
| 2014/0067156 A1 | 3/2014 | Gehlen | |
| 2014/0358987 A1 | 12/2014 | Howard et al. | |
| 2015/0082003 A1 | 3/2015 | Vorbach | |
| 2015/0220746 A1 | 8/2015 | Li et al. | |
| 2015/0242198 A1 | 8/2015 | Tobolski et al. | |
| 2015/0268133 A1 | 9/2015 | Ranjan et al. | |
| 2015/0331043 A1 | 11/2015 | Sastry et al. | |
| 2015/0370580 A1 | 12/2015 | Litovtchenko | |
| 2016/0112203 A1 | 4/2016 | Thom et al. | |
| 2016/0127221 A1 | 5/2016 | Theogaraj et al. | |
| 2016/0266836 A1 | 9/2016 | Tran et al. | |
| 2016/0323791 A1 | 11/2016 | Theogaraj et al. | |
| 2016/0344705 A1 | 11/2016 | Stumpf et al. | |
| 2017/0031672 A1* | 2/2017 | Ruble | G06F 8/654 |
| 2017/0060559 A1 | 3/2017 | Ye et al. | |
| 2017/0062066 A1 | 3/2017 | Narai et al. | |
| 2017/0076768 A1 | 3/2017 | Son et al. | |
| 2018/0019006 A1 | 1/2018 | Brandl et al. | |
| 2018/0039544 A1 | 2/2018 | Scobie et al. | |
| 2018/0121282 A1 | 5/2018 | Barrilado Gonzalez et al. | |
| 2018/0143935 A1 | 5/2018 | Cox et al. | |
| 2018/0167216 A1 | 6/2018 | Walrant | |
| 2018/0167218 A1 | 6/2018 | Walrant | |
| 2018/0198846 A1 | 7/2018 | Srinivasan et al. | |
| 2018/0285385 A1* | 10/2018 | West | G06F 9/4406 |
| 2019/0087752 A1 | 3/2019 | Kaufer et al. | |
| 2019/0146869 A1 | 5/2019 | Howe | |
| 2019/0166635 A1 | 5/2019 | Mccolgan et al. | |
| 2019/0205263 A1 | 7/2019 | Fleming et al. | |
| 2019/0227747 A1 | 7/2019 | Colombo | |
| 2019/0378355 A1 | 12/2019 | Bruneel et al. | |
| 2020/0169459 A1 | 5/2020 | Colombo | |

* cited by examiner

PRIOR ART

PROCESSING SYSTEM, RELATED INTEGRATED CIRCUIT, DEVICE AND METHOD

CROSS-REFERENCE TO RELATED APPLICATIONS

This application is a continuation of U.S. patent application Ser. No. 16/273,704, filed on Feb. 12, 2019, which claims the benefit of Italian Application No. 102018000002895, filed on Feb. 21, 2018, which applications are hereby incorporated by reference herein in their entirety.

TECHNICAL FIELD

Embodiments of the present disclosure relate to processing systems, such as micro-controllers, having associated a memory in which configuration data are stored.

BACKGROUND

FIG. 1 shows a typical electronic system, such as the electronic system of a vehicle, comprising a plurality of processing systems 10, such as embedded systems or integrated circuits, e.g., a Field Programmable Gate Array (FPGA), Digital Signal Processor (DSP) or a micro-controller (e.g., dedicated to the automotive market).

For example, FIG. 1 shows three processing systems 101, 102, and 103 connected through a suitable communication system 20. For example, the communication system 20 may include a vehicle control bus, such as a Controller Area Network (CAN) bus, and possibly a multimedia bus, such as a Media Oriented Systems Transport (MOST) bus, connected to a vehicle control bus via a gateway. Typically, the processing systems 10 are located at different positions of the vehicle and may include, e.g., an Engine Control Unit (ECU), a Transmission Control Unit (TCU), an Anti-lock Braking System (ABS), body control modules (BCM), or a navigation or multimedia audio system.

Future generations of processing systems, in particular micro-controllers dedicated to automotive applications, will exhibit a significant increase in complexity, mainly due to the increasing number of functionalities (such as new protocols, new features, etc.) and to the tight constraints concerning the operation conditions of the system (such as lower power consumption, increased calculation power and speed, etc.).

FIG. 2 shows a block diagram of an exemplary digital processing system 10, such as a micro-controller, which may be used as any of the processing systems 10 of FIG. 1.

In the example considered, the processing system 10a includes at least one processing unit 102, such as a microprocessor, usually the Central Processing Unit (CPU), programmed via software instructions. Usually, the software executed by the processing unit 102 is stored in a program memory 104a, such as a non-volatile memory, such as a Flash memory or EEPROM. Generally, the memory 104a may be integrated with the processing unit 102 in a single integrated circuit, or the memory 104a may be in the form of a separate integrated circuit and connected to the processing unit 102, e.g., via the traces of a printed circuit board. Thus, in general, the memory 104a contains the firmware for the processing unit 102, wherein the term firmware includes both the software of a microprocessor and the programming data of a programmable logic circuit, such as an FPGA.

In the example considered, the processing unit 102 may have associated one or more resources 106, such as:

one or more communication interfaces, such as Universal asynchronous receiver/transmitter (UART), Serial Peripheral Interface Bus (SPI), Inter-Integrated Circuit ($I^2C$), Controller Area Network (CAN) bus, Ethernet, or debug interfaces; or one or more analog-to-digital or digital-to-analog converters; or one or more dedicated digital components, such as hardware timers or counters, or a cryptographic co-processor; or one or more analog components, such as comparators, sensors, such as a temperature sensor, etc.; or one or more mixed signal components, such as a PWM (Pulse-Width Modulation) driver.

Accordingly, the digital processing system 10 may support different functionalities. For example, the behavior of the processing unit 102 is determined by the firmware stored in the memory 104a, e.g., the software instructions to be executed by a microprocessor 102 of a micro-controller 10. Thus, by installing a different firmware, the same hardware (e.g., micro-controller) can be used for different applications. Often, the behavior of the processing system 10 may also be varied based on configuration data CD. For example, these configuration data CD may be written into specific areas of the non-volatile program memory 104a and retrieved when the processing system 10a is powered on. Alternatively or in addition, the configuration data CD may be stored in an additional non-volatile memory 104b, such as a one-time programmable (OTP) memory, e.g. implemented with fuses. For example, the program memory 104a may be used, in case the blocks shown in FIG. 2 are integrated in a common integrated circuit. Conversely, an additional non-volatile memory 104b may be used, in case the program memory 104a is an external memory, and only the other blocks are integrated in a common integrated circuit. Accordingly, generally, the configuration data CD are stored in a non-volatile memory (104a or 104b) of the integrated circuit including the blocks requiring configuration data, such as the processing unit 102 or one or more of the hardware resources 106.

For example, such configuration data CD are often calibration data used to guarantee that the hardware behavior is uniform, thereby compensating possible production process tolerances. For example, this applies often to the calibration of analog components of the processing system, such as a temperature sensor, analog-to-digital converter, voltage reference, etc. For example, a voltage monitor threshold level of an analog comparator could be "trimmed" to the exact intended value by adjusting some levels with configuration/calibration data, which are written by the producer of the hardware of the processing systems, e.g. the micro-controller producer.

Moreover, the configuration data CD may also be used to customize the behavior of the hardware, e.g., the hardware resources 106, according to different application needs. For example, once the firmware of the processing system 10 has been stored in the processing system 10, some configuration data may be written in order to deactivate the debug interface, which e.g. could be used to download the firmware of the processing system 10.

The processing system may also be configured to permit that a first part of the configuration data CD is written by the producer of the hardware of the processing system (e.g., the producer of an integrated circuit), and a second part of the configuration data CD is written by the developer of the firmware of the processing system 10.

Typically, the programmed configuration data CD is read during a reset phase, which usually starts as soon as the processing system 10 is powered on. Specifically, as shown in FIG. 2, the processing system 10 may include for this purpose a configuration circuit 108 configured to read the configuration data CD from the non-volatile memory 104a or 104b, and distribute these configuration data CD within the processing system 10.

SUMMARY

In view of the above, it is an objective of various embodiments of the present disclosure to provide solutions for monitoring the correct operation of the blocks involved during the configuration of the processing system.

According to one or more embodiments, one or more of the above objectives is achieved by a processing system having the features specifically set forth in the description that follows. Embodiments moreover concern a related integrated circuit, device and method.

As mentioned before, various embodiments of the present disclosure relate to a processing system. In various embodiments, the processing system include at least one hardware block, a non-volatile memory, a hardware configuration circuit, and a plurality of configuration data clients.

Specifically, in various embodiments, each configuration data client includes a register, wherein with each configuration data client is associated a respective address, and wherein each configuration data client is configured to receive configuration data addressed to the respective address and store the configuration data received in the register. The hardware block(s) are connected to the configuration data clients and change operation as a function of the configuration data stored in the registers of the configuration data clients.

In various embodiments, the respective configuration data are stored in the non-volatile memory. Specifically, the configuration data are stored in the form of data packets including an attribute field identifying the address of one of the configuration data clients and the respective configuration data. In various embodiments, the hardware configuration circuit is thus configured to sequentially read the data packets from the non-volatile memory and transmit the respective configuration data read from the non-volatile memory to the respective configuration data client.

In various embodiments, the non-volatile memory has stored also signature data, wherein the hardware configuration circuit is configured to also read the signature data from the non-volatile memory.

Specifically, in various embodiments, the processing system includes moreover a signature calculation circuit configured to calculate further signature data as a function of the respective configuration data transmitted to the configuration data clients or stored in the registers of the configuration data clients. For example, for this purpose, once having received configuration data, each configuration data client may transmit the respective configuration data to the signature calculation circuit. Additionally or alternatively, the signature calculation circuit may monitor the data transmitted between the hardware configuration circuit and the configuration data clients, e.g., in case a common bus is used.

The signature data and the further signature data are provided to a signature verification circuit. Specifically, in various embodiments, the signature verification circuit compares the signature data read from the non-volatile memory with the signature data calculated by the signature calculation circuit and generates an error signal when the signature data do not correspond. For example, the signature calculation circuit may calculate the signature data with a hashing function, such as MD5 or Secure Hash Algorithm, e.g. SHA-1 or SHA-256, or calculate the signature data by encoding or encrypting the configuration data, e.g. by using the Advanced Encryption Standard or Data Encryption Standard, and selecting a subset of the encoded/encrypted data.

In various embodiments, the signature data may be stored together with the configuration data in the non-volatile memory in the form of one or more data packets. More specifically, in various embodiments, the signature calculation circuit itself has associated at least one configuration data client. In this case, the signature data may thus be stored in the non-volatile memory in the form of configuration data including one or more data packets including an attribute field identifying the address of the configuration data client(s) associated with the signature calculation circuit.

Generally, the non-volatile memory may include also a plurality of sets of configuration data, wherein respective signature data are stored for each set of configuration data, and wherein the signature calculation circuit is configured to calculate respective signature data for the configuration data of each set of configuration data transmitted to the configuration data clients or stored in the registers of the configuration data clients.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments.

The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
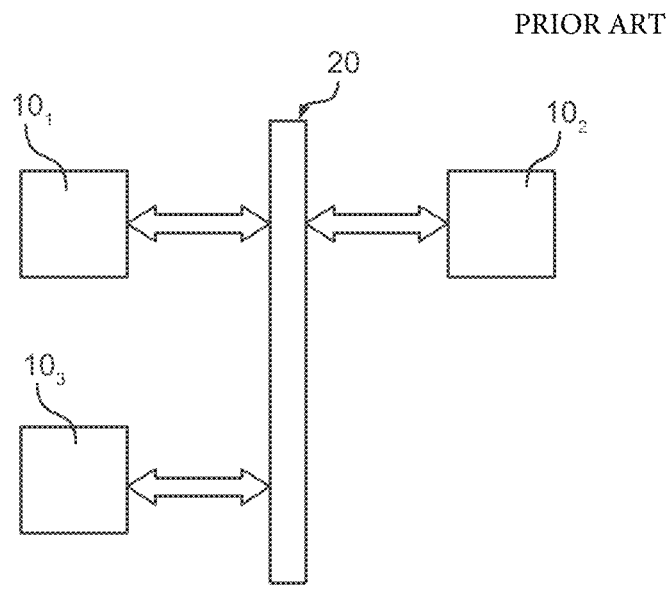
FIG. 1 shows a typical electronic system.
Figure 2:
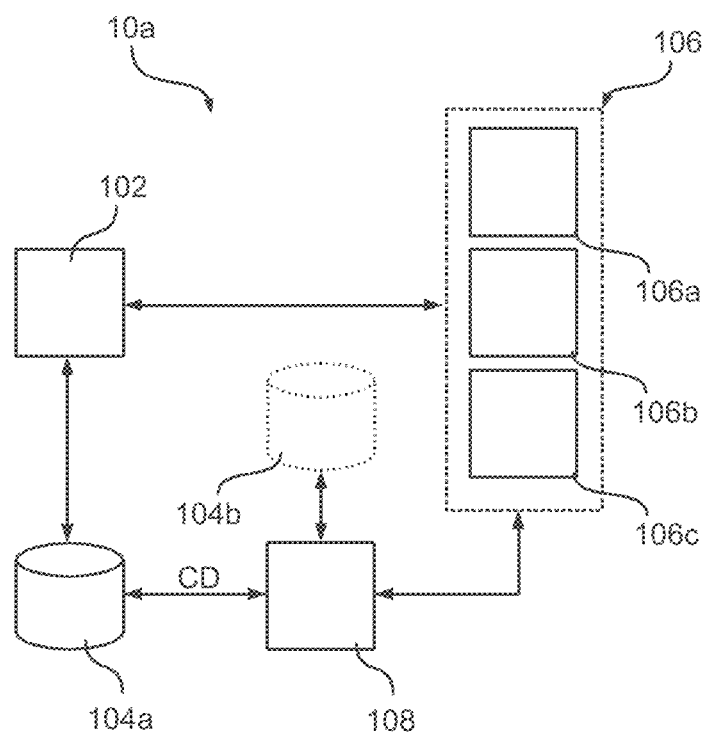
FIG. 2 shows a processing system including a configuration circuit.

In the following FIGS. 3 to 10 parts, elements or components which have already been described with reference to FIGS. 1 and 2 are denoted by the same references previously used in such Figures; the description of such previously described elements will not be repeated in the following in order not to overburden the present detailed description.

As described in the foregoing, the hardware of processing system 10a may be configurable by a set of configuration data, i.e., parameters which are (e.g., permanently) stored in the non-volatile memory.

Figure 3:
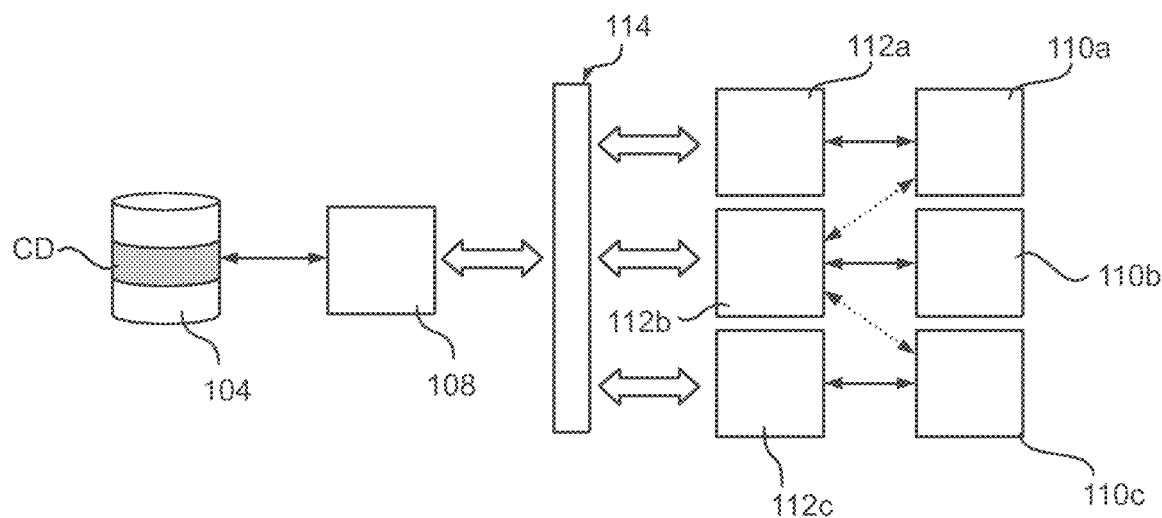
FIG. 3 shows a first embodiment of a processing system including a non-volatile memory having stored configuration data, a configuration circuit and configuration data clients.

For example, FIG. 3 shows a possible embodiment for distributing such configuration data CD in the processing system 10a as described e.g. with respect to FIG. 2. Accordingly, the description of FIG. 2 applies in its entirety also to the processing system 10a of FIG. 3.

In the embodiment considered, one or more configuration data CD are stored in one or more non-volatile memories 104 (i.e., memories 104a or 104b). In various embodiments, these configuration data CD are stored in reserved memory areas, e.g. in the form of a plurality of consecutive memory locations.

Accordingly, in the embodiment of FIG. 3, the configuration circuit 108 accesses the reserved memory areas containing the configuration data CD, reads the configuration data CD, and transmits the configuration data CD to a respective block 110 within the processing system 10a. Generally, the block 110 may correspond to any block of the processing system 10a requiring configuration data and may correspond to the processing unit 102, a hardware resource 106, or even a memory (e.g., the memory 104a). For example, the block 110 may be a debug interface of the processing system 10a, which is enabled or disabled based on the configuration data CD. Similarly, the configuration data CD may be used to configure read or write protected areas of a memory.

In the embodiment, each block 110 has associated a respective configuration data client 112. For example, in FIG. 3 are shown three blocks 110a, 110b and 110c and three configuration data clients 112a, 112b and 112c. Generally, each configuration data client 112 may be associated univocally to a single hardware block 110, and provided configuration data only to the associated hardware block 110, e.g., a specific hardware resource 106, or may be associated with a plurality of hardware blocks 110, e.g., a plurality of hardware resource 106. In general, the configuration data clients 112a, 112b and 112c may also be integrated in the respective block 110a, 110b and 110c.

Accordingly, in the embodiment considered, the configuration circuit 108 may determine for each target block 110 to be configured the respective configuration data (selected from the configuration data CD) and transmit the configuration data associated with the target block 110 to the configuration data client 112 associated with the target block 110. Similarly, while reading the configuration data CD from the memory 104, the configuration circuit 108 may determine the target block(s) for the current configuration information and send the current configuration data to the configuration data client(s) associated with the respective target block(s). Generally, any communication may be used for transmitting the configuration data to the configuration data client 112, including both serial and parallel communications. For example, the configuration circuit 108 and the configuration data clients 112 may be connected via a bus 114, and each configuration data clients 112 may have associated a respective target address.

Accordingly, each configuration data client 112 is configured to receive the configuration data from the circuit 108, store them into the internal register, e.g. store them into one or more internal flip-flops or latches. The data stored in the register may then be used to generate one or more signals, which influence the behavior of one or more hardware blocks 110.

Figure 4:
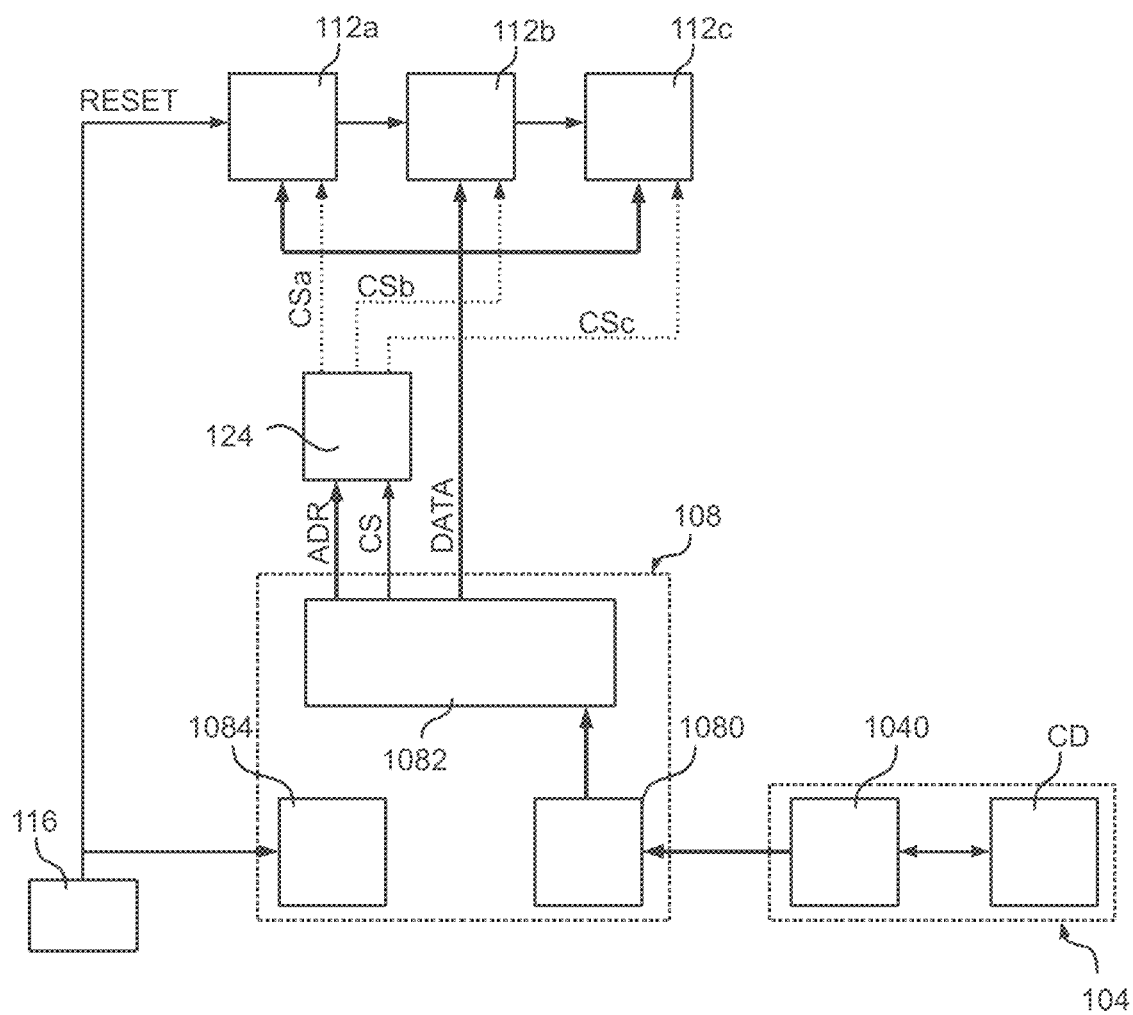
FIG. 4 shows an embodiment of the processing system of FIG. 3.

FIG. 4 shows, in this respect, a possible embodiment of the communication between the configuration circuit 108 and the configuration data clients 112.

Specifically, also in this case, the processing system 10a includes a configuration circuit 108 configured to read the configuration data CD from one or more non-volatile memories 104 (e.g., memories 104a or 104b) and a plurality of configuration data clients 112 configured to receive respective configuration data from the circuit 108 and distribute them among a plurality of blocks 110 (not shown in FIG. 4) requiring configuration data. For example, as mentioned before, each configuration data client 112 may be associated univocally with a respective block 110. For example, in the embodiment considered, the processing system 10a includes again three configuration data clients 112a, 112b and 112c.

In the embodiment considered, the configuration circuit 108 includes a data read circuit 1080 configured to read the configuration data CD from the memory 104 and a dispatch circuit 1082 configured to transmit the configuration data to the configuration data clients 112.

Generally, any communication may be used for communication between the dispatch circuit 1082 and the configuration data clients 112.

For example, in various embodiments, the communication between the dispatch circuit 1082 and the configuration data clients 112 is based on data frames in accordance with a given format, called in the following Device Configuration Format (DCF). For example, in various embodiments, each data frame includes two fields: the payload (i.e., the real data), called DCF Format payload, and possible additional data attributes used to identify the receiver of the data, called DCF Format attributes, wherein the receiver is one of the configuration data clients 112 representing a DCF client. For example, the data attributes may be expressed or present in 16 or 32 bits, wherein a given number of bits specifies the address of one of the configuration data clients 112, and the payload may be expressed or present in 16 or 32 bits. For example, in various embodiments, the data read circuit 1080 is configured to read blocks of 64 bits from the memory 104, wherein the first 32 bits contain the data attributes (including the address of a configuration data client) and the second 32 bits contain the configuration data to be transmitted to the address specified in the data attributes.

In the embodiment considered, each configuration data client/DCF client 112 is a hardware circuit, usually including a combinational circuit configured to store the received data in an internal register implemented, e.g., with flip-flops/latches, thereby permitting to distribute, via one or more internal signals generated as a function of the data stored in the internal register, the configuration data received to various parts of the associate hardware block(s) 110. For example, as mentioned before, each configuration data client 112 may have associated a univocal address (i.e., univocal within each processing system ma) and analyses the data transmitted by the dispatch circuit 1082 in order to determine whether the additional data attributes (DCF Format attributes) contain the address associated with the configuration data client 112.

For example, as mentioned before, the configuration data CD may also include security configuration data used to activate or deactivate given security functions of the processing system 10a, such as the external access to a debug interface; or the (read or write) access to given memory locations, etc.

In this case, a first configuration data client 112 may store configuration data CD, which signal to a memory of the processing system 10a, such as the memory 104, whether to enable or disable a write or read protection associated with one or more memory blocks of the memory. Similarly, a second configuration data client 112 may store configuration data used to generate a signal controlling the access to a debug interface. Specifically, the associated blocks 110 do not use directly the configuration data CD stored in the non-volatile memory 104 but the configuration data stored in the respective configuration data client 112.

In various embodiments, the circuit 108 may also include a state control circuit 1084 configured to manage the various configuration phases of the processing system 10a. For example, in various embodiments, once the processing system 10a is switched-on, a reset circuit 116 of the processing system 10a may generate a reset signal RESET, which is used to perform a reset of the various components of the processing system 10a. For example, the reset signal RESET may correspond to a reset pulse of a given number of clock cycles, provided to the blocks 110 of the processing system 10a. For example, in the embodiment considered, the reset signal RESET may be used by the configuration data clients 112 in order to set the internal register to a given reset value. Similarly, in response to a reset, the state control circuit 1084 may activate the configuration phase. Specifically, during the configuration phase, the data read circuit 1080 may read the configuration data CD from the memory 104 and the dispatch circuit 1082 may send the configuration data CD to the various configuration data clients 112, thereby overwriting the reset values.

Accordingly, as mentioned before, the configuration data CD may be stored as data packets/DCF frames in one or more reserved memories of at least one non-volatile memory 104. Generally, the configuration data programmed to the non-volatile memory 104 may not include necessarily configuration data CD for all configuration data clients 112 but only the configuration data CD which are different from the default/reset values.

For example, as mentioned in the foregoing, the configuration data CD may include several sub-sets of configuration data:

a first group of configuration data (e.g., calibration data) written by the producer of the processing system 10a, e.g. the chip manufacture; and a second group of configuration data written during a later stage, such as configuration data written by the firmware developer or a system integrator, such as the producer of an Engine Control Unit (ECU).

Generally, these groups of configuration data may be written to different areas of the memory(ies) 104, thereby permitting that these groups may be configured independently. Conversely, in various embodiments a single non-volatile memory 104 is used and the data packets/DCF frames may be stored consecutively one after the other. For example, the producer of the processing system 10a may store a first set of configuration data CD to the non-volatile memory and a software developer may store a second set of configuration data to the non-volatile memory by appending the new configuration data to the first set of configuration data. Similarly, also the system developer, e.g., the producer of an ECU, may set a third set of configuration data by appending further configuration data to the second set of configuration data.

In the embodiment considered, the configuration circuit 108 reads these data packets/DCF frames from the non-volatile memory 104 during the reset phase, e.g. as controlled by the state control circuit 1084. Specifically, in various embodiments, the configuration circuit 108, in particular the data read circuit 108o, starts the read operation from a start address of the memory 104 (which may be fixed or programmable) and continuous the reading operation until the last data packets/DCF frame has been read from the non-volatile memory 104. Generally, the data read circuit 108o may also access a plurality of non-volatile memories 104, or generally a plurality of memory areas, which may belong to one or more non-volatile memories 104. For example, a first memory area may be programmable only by the producer of the processing unit boa and a second memory area may be programmable by the software or system developer.

In the embodiment considered, each data packet/DCF frame read from the non-volatile memory 104 is provided to the dispatch circuit 1082, which forwards the configuration data CD included in the data packet/DCF frame, in particular the payload, to a respective configuration data client 112. Specifically, in the embodiment considered, the dispatch circuit 1082 is configured to generate a data signal DATA having a given number of bits (corresponding to the bits of the payload) containing the configuration data to be transmitted to a given configuration data client 112 and further control signals for selecting the target configuration data client 112. For example, in the embodiment considered, the dispatch circuit 1082 generates also an address signal ADR containing the address of the target configuration data client 112 and optionally a chip select signal CS used to signal that the address signal ADR and the data signal DATA are valid. For example, in various embodiments, the address signal ADR (and the chip select signal CS) may be provided to a decoder 124 configured to activate one of the configuration data clients 112 as a function of the address signal ADD. For example, in the embodiment considered, the decoder 124 may set a chip select signal CSa in order to indicate that the configuration data client 112a should read the data signal DATA when the address signal ADR corresponds to an address assigned to the configuration data client 112a (and the chip select signal CS is set). Similarly, the decoder 124 may set a chip select signal CSb in order to indicate that the configuration data client 112b should read the data signal DATA when the address signal ADR corresponds to an address assigned to the configuration data client 112b (and the chip select signal CS is set), etc.

Thus, the configuration circuit 108 sequentially reads the configuration data packets and transmits the respective configuration data to the associated configuration data client 112. Accordingly, the configuration data CD may be stored during the various production and development phase as a sequence of consecutive data packets/DCF frames. For example, this implies that, in case the one or more non-volatile memories 104 contain two or more data packets/DCF frames, which are addressed to the same configuration data client 112, the configuration data circuit 108 will transmit sequentially the respective configuration data of these two or more data packets/DCF frames to the same configuration data client 112, and the configuration data client 112 will overwrite the previous values, i.e., the configuration data client 112 will only provide the last configuration data having been received.

Generally, due to the fact that the configuration data CD stored in the one or more non-volatile memories 104 may also be used to control the various security features of the processing system 10a, it is advantageous that the programmed configuration data CD cannot be altered anymore. For example, in various embodiments, each non-volatile 104 may be configured to inhibit write accesses to already programmed memory locations of the memory area(s), which may include configuration data, i.e., the non-volatile memory area(s) where the configuration data may be stored cannot be erased or re-programmed, thereby ensuring that configuration data CD already stored in the one or more non-volatile memories 104 may be altered within the non-volatile memory 104.

Generally, the use of plural DCF frames addressed to the same configuration data client 112 may be useful in order to permit a recalibration of the processing system, e.g. by appending a DCF frame with new calibration data to the already existing configuration data CD in the non-volatile memory 104. In fact, in this way, the various calibration data will be read during the reset phase, but the respective configuration data client 112 will only use the calibration data programmed last. Conversely, it may be rather dangerous when already activated security or safety functions could be deactivated by simply appending respective configuration data CD to the non-volatile memory 104.

Accordingly, in various embodiments, each configuration data client 112 may be configured to permit or inhibit overwriting of previous configuration data. For example, possible solutions for controlling the write operations in a configuration data client 112 are described in the Italian patent application 102018000001633, which is incorporated herein by reference for this purpose.

Thus, the arrangement described with respect to FIG. 4 provides an efficient solution for distributing configuration data CD within a processing system 10a, permitting also that the configuration data CD may be set by different entities (producer, software developer, etc.) without having to overwrite the previous configuration data in the non-volatile memory 104. Moreover, also the reconfiguration of previously written configuration data may be limited within each configuration data client 112.

However, the arrangement does not take into account that the configuration data provided by the memory 104 may not correspond to the configuration data stored to the memory 104.

For example, the memory 104 may provide incorrect data due to errors in the data contained in the memory, e.g., due to corruption of the configuration data CD, or due to an intentional modification of the data stored in the memory 104. A possible solution to this problem is the use of an error-correcting code (ECC) memory. For example, in this case, the memory 104 includes an error detection or correction circuit 1040 (see FIG. 4), which detects and possibly also corrects modifications in the data read from the memory.

However, the memory 104 itself may not operate correctly and may not provide at all configuration data or skip one or more configuration data. For example, this may happen when the communication between the data read circuit 108o and the memory 104 is not operating correctly. For example, as mentioned before, the data read circuit 1080 may send an address signal to the memory 104 and the memory 104 may return the respective data signal containing the data stored at the address provided. Hence, an alteration of the address bus (both intentional, like in the case of an attack, or unintentional, like in the case of a malfunction) may result, e.g., in a reading of different data or skipping the reading of some configuration data. Similarly, also the data bus between the memory 104 and the data read circuit 1080 may not operate correctly. However, such malfunctions may not be detected by an error detection or correction circuit 1040, insofar as the data read from the memory for a given (incorrect) address are indeed correct and only the communication of the data or the address signal is affected by a malfunction.

However, in case some configuration data CD are not read correctly or skipped, there could be consequences for availability (the device might not work properly), quality (a wrong behavior could compromise the overall quality), safety (a wrong behavior could translate into a safety threat) or security (some security functions may be deactivated).

In the following will thus be described embodiments able to verify whether the data transmitted to the configuration data clients 112 indeed corresponds to the data initially written to the non-volatile memory 104.

Figure 5A:
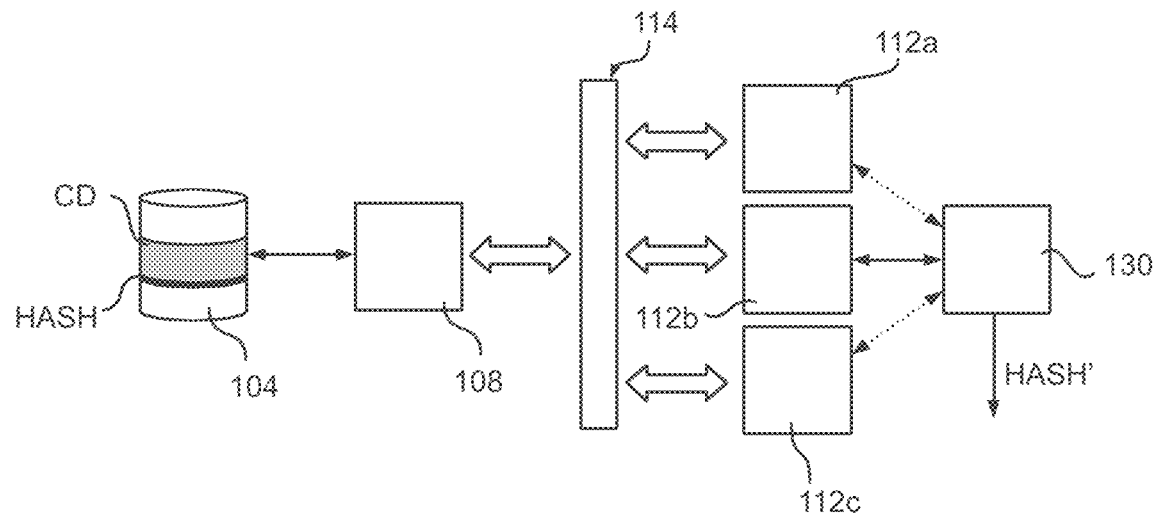
FIGS. 5a and 5b show embodiments for calculating signature data as a function of the configuration data transmitted to the configuration data clients of FIG. 3.

FIG. 5a shows a first embodiment of a modified processing system 10a, which essentially corresponds to the architecture described with respect to FIG. 3. Accordingly, the respective description and the exemplary detailed embodiment of FIG. 4 also apply in this case.

Specifically, with respect to FIG. 3, the memory 104 does not only contain the configuration data CD, but also a respective signature HASH calculated as a function of the configuration data CD.

Generally, the term "signature" indicates that the respective signature data are calculated as a function of the configuration data. For example, a hashing function may be used for this purpose, such as MD5 or Secure Hash Algorithm (SHA), e.g., SHA-1 or SHA-256. Generally, the configuration data may also be encoded or encrypted, e.g., by using Advanced Encryption Standard (AES) or Data Encryption Standard (DES), and a subset of the encrypted data, e.g. the last data packet, may be used as signature field.

As mentioned before, the configuration data may include a plurality of sets of configuration data. In this case, each set of configuration data includes a respective signature. Generally, the signature of the first set of configuration data is calculated as a function of the respective configuration data. Conversely, the signature of the following sets of configuration data may be calculated either:

exclusively as a function of the respective set of configuration data, i.e., the signature is independent from the previous sets of configuration data; or taking into account also the previous configuration data, e.g., by calculating a signature for the configuration data of all previous sets of configuration data.

Preferably, the first solution is used in order to render the sets of configuration data independent from each other. However, also the second solution may be implemented rather easily when a signature calculation method is used which may simply use the signature of the previous set of configuration data as starting value for the calculation of the new signature. For example, the respective signature value may be provided by the producer of the processing system to the following software developer, etc.

In the embodiment considered, the processing system 10a includes moreover a signature calculation circuit 130 configured to recalculate the signature directly as a function of the configuration data read from the memory 104.

Specifically, in the embodiment shown in FIG. 5a, the signature calculation circuit 130 receives at input the configuration data having been stored in the internal registers of the data clients 112, i.e. each configuration data client 112 provides the configuration data received not only to the associated hardware block(s) 110 but also the signature calculation circuit 130. Due to the sequential transmission of the configuration data packets to the configuration data clients 112, each configuration data client 112 may thus signal sequentially that new data have been arrived and the signature calculation circuit 130 may read the configuration data from the configuration data client having currently received configuration data, thereby re-calculating a signature HASH' as a function of the configuration data received by the configuration data clients 112.

Figure 5B:
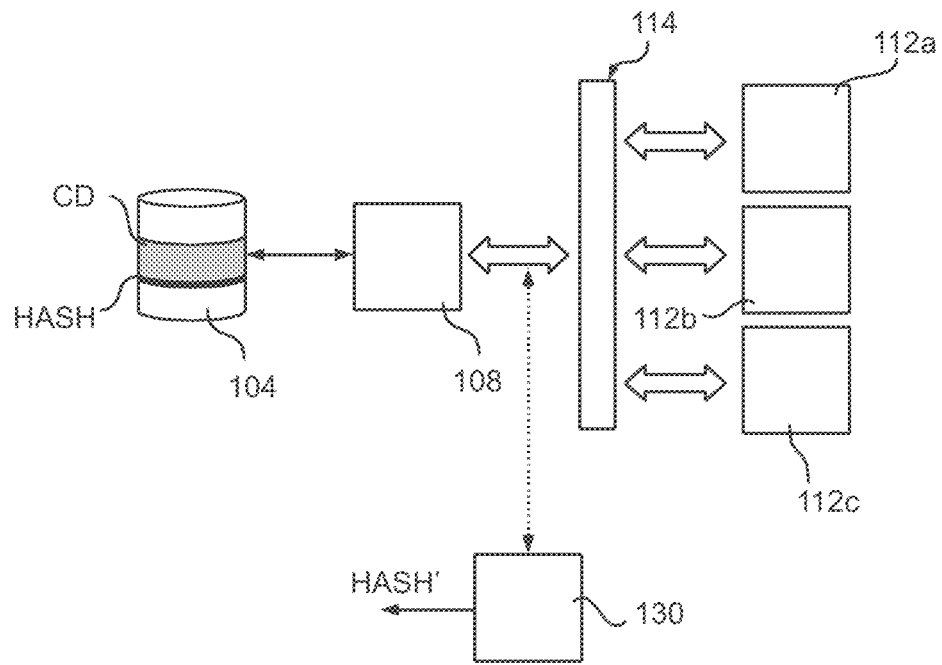

Conversely, FIG. 5b shows an embodiment, wherein the signature calculation circuit 130 receives at input the data transmitted to the configuration data client, e.g., the signature calculation circuit 130 monitors the data transmitted on the communication channel 114, e.g., the data signal DATA of FIG. 4. Thus, assuming that the configuration data clients also receive the configuration data transmitted, also in this case, the signature calculation circuit may recalculate a signature HASH' as a function of the configuration data transmitted to the configuration data clients 112.

Thus, knowing the original signature HASH stored in the memory 104 and by recalculating a signature HASH' as a function of the configuration data provided to the configuration data clients, the processing system 10a may verify whether both signatures correspond.

Generally, the solution of FIG. 5a is preferably, insofar as indeed the data stored in the configuration data clients 112 are verified, thereby permitting a verification of all intermediate components from the memory 104 up to the configuration data clients 112. However, in this case, the signature calculation circuit 130 has to be connected to all configuration data clients 112 rendering the solution more complex than the solution of FIG. 5b, which merely has to monitor the communication channel 114, while still ensuring that the configuration data read from the memory 104 are indeed correct.

Figure 6A:
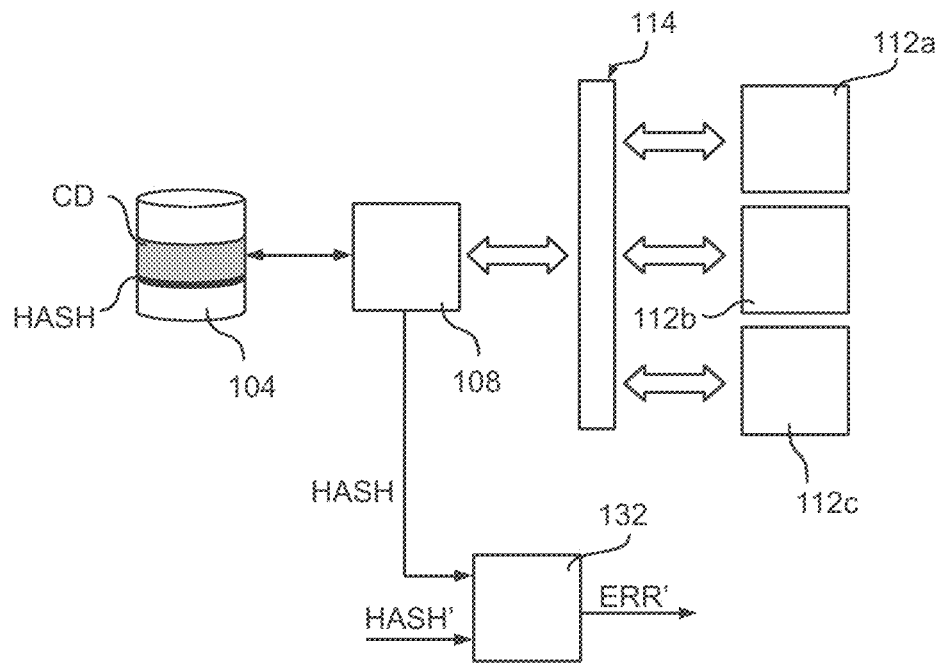
FIGS. 6a and 6b show embodiments for reading pre-calculated signature data from the non-volatile memory of FIG. 3.

FIG. 6a shows a first embodiment for verifying both signatures HASH and HASH'.

Specifically, in the embodiment considered, the configuration circuit 108 is configured to read the signature HASH from the memory 104 and provide the signature HASH directly to a signature verification circuit 132 configured to compare the signature HASH with the recalculated signature HASH'.

Figure 6B:
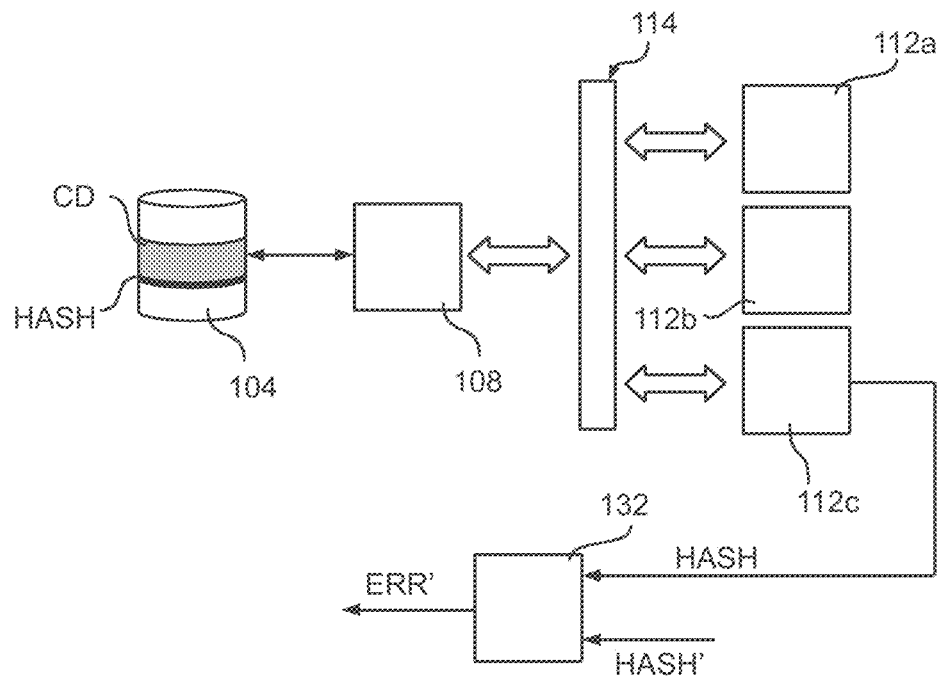

Conversely, FIG. 6b shows an embodiment, wherein the signature HASH is stored as one or more of the configuration data packets (in particular, the last one of a respective set of configuration data). Moreover, one or more of the configuration data clients 112, e.g., the client 112c, represent configuration data clients of the signature verification circuit 132. Thus, by storing in the attribute field of the configuration data packets the address of the respective configuration data client(s) 112, the configuration circuit 108 will read the signature HASH as a normal configuration data packet and will transmit the signature HASH via the communication channel 114 to the configuration data client(s) associated with the signature verification circuit 132.

Accordingly, in both cases, the signature verification circuit 132 receives at input the signature HASH stored in the memory 104 and the signature HASH' recalculated by the signature calculation circuit 130 (see also FIGS. 5a and 5b). The circuit 132 may thus verify whether both signatures correspond and may generate an error signal ERR when the signatures do not correspond.

Figure 7:
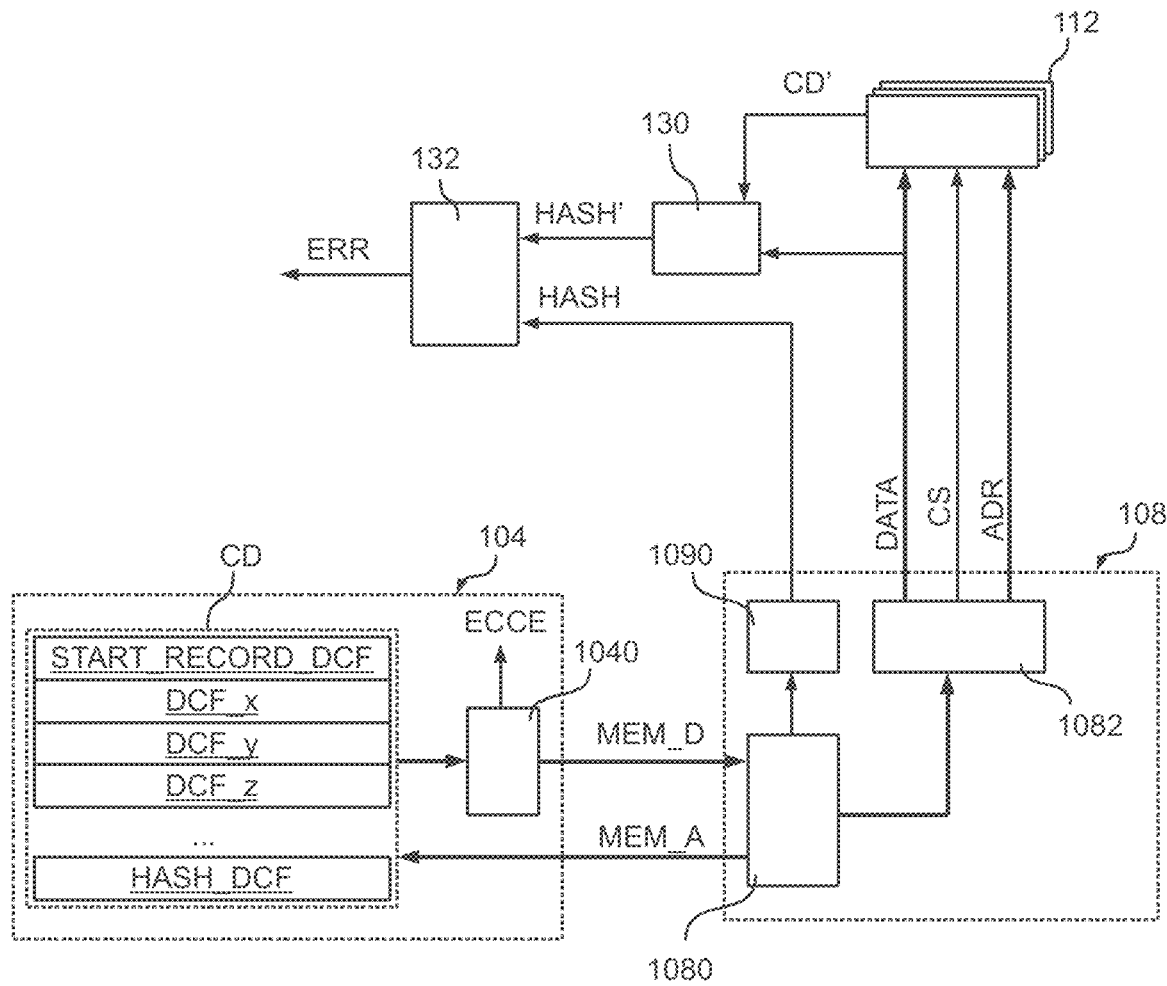
FIG. 7 shows an embodiment of a processing system configured to compare the calculated signature data of FIGS. 5a and 5b with the pre-calculated signature data of FIGS. 6a and 6b.

For example, FIG. 7 shows an embodiment of the verification of the signatures based on the architecture shown in FIG. 4.

Specifically, as mentioned before, the processing system 10a has to handle an expected configuration data signature HASH and a run-time calculated configuration data signature HASH'. For example, in FIG. 7 is shown again a memory 104, possibly including an error detection or correction circuit 1040, which receives at input an address signal MEM_A and provides at output a data signal MEM_D including the respective data. Specifically, as before, the memory 104 includes one or more sets of configuration data CD, and for each set of configuration data CD a respective signature field. For example, in the embodiment considered, each set of configuration data CD includes a start packet START_RECORD_DCF. The optional start packet START_RECORD_DCF is followed by one or more configuration data packets DCF_x, DCF_y, DCF_z, etc. including the configuration data to be transmitted to the configuration data clients 112 and one or more signature packet HASH_DCF including the signature HASH. Preferably, all these packets follow the DCF format described in the foregoing. As described in the foregoing, the signature HASH is pre-calculated and stored in the memory 104 together with the configuration data (typically during the production stage of the processing system or the software development phase).

Accordingly, the data read circuit 1080 of the configuration circuit 108 may read the configuration data including the records START_RECORD_DCF, DCF_x, DCF_y, DCF_z, HASH_DCF from the memory 104 by providing a suitable address signal MEM_A. For example, the data read circuit 1080 may start the reading from the start address of the first record (i.e., START_RECORD_DCF or DCF_x based on whether a start record is used) and continue reading until the signature record HASH_DCF is detected (e.g., in the absence of a start record START_RECORD_DCF).

During the reading of the configuration data records, the data read circuit 1080 provides the respective configuration data packets (DCF_x, DCF_y, DCF_z, etc.) to the dispatch circuit 1082 which transmits the configuration data to the configuration data clients 112, e.g. by using the address signal ADR, the data signal DATA and the chip select signal CS described in the foregoing.

In the embodiment considered, the processing system 10a includes moreover a signature calculation circuit 130 configured to capture the configuration data sent to/received by the configuration data clients 112 and calculates in run-time the signature HASH' as a function of the transferred data.

For example, for this purpose, the signature calculation circuit 130 may monitor the data signal DATA and or read the configuration data CD' stored in the configuration data clients 112. As mentioned before the later solution is preferable in order to verify also the operation of the configuration data clients 112 themselves. Conversely, the former being less complex. Specifically, the former solutions may also be suitable, when the configuration data clients 112 themselves include failure detection mechanisms.

Figure 8:
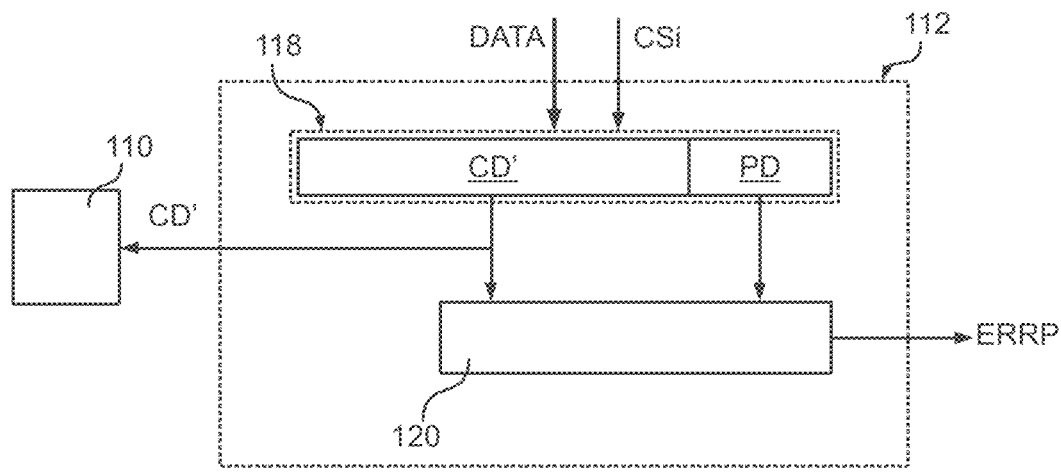
FIG. 8 shows an embodiment of a configuration data client.

For example, FIG. 8 shows an embodiment of a configuration data client 112 with failure detection mechanism.

Specifically, the configuration data client includes a register 118, e.g. in the form of flip-flops or latches, configured to store the data received via the data signal DATA. For example, in the embodiment considered, the data provided via the data signal DATA are stored in the register 118 when a respective chip select signal CSi is set.

In the embodiment considered, the data received do not contain only configuration data, but also error detection data, such as one or more parity bits. Accordingly, in the embodiment considered, the register 118 provides respective configuration data CD' and error detection data PD. For example, as described in the foregoing, the configuration data CD' are provided to one or more blocks 110 of the processing system 10a and optionally also to the signature calculation circuit 130. However, in the embodiment considered, the configuration data CD' and the error detection data PD are provided also to an error detection circuit 120 configured to recalculate the error data as a function of the configuration data CD' and verify whether the recalculated error data correspond to the error detection data PD. For example, in FIG. 8, the circuit 120 may generate an error signal ERRP when the error data do not correspond.

Accordingly, in such an architecture, each configuration data client may verify whether the transmitted configuration data CD' are also valid.

Generally, the signature calculation circuit 130 may thus calculate the signature HASH' sequentially while the configuration data are transmitted to the configuration data clients 112. Once all configuration data CD have been transmitted to the configuration data clients 112, the data read circuit 112 will thus also read the signature packet(s) HASH_DCF including the signature HASH. Specifically, in the embodiment considered, the signature HASH is stored in a register 1090 within the configuration circuit 108.

Accordingly, in the embodiment considered, the signature calculation circuit 130 and the register 1090 provide the signatures HASH and HASH' to a signature verification circuit 132, which compares the signatures HASH and HASH' and generates an error signal ERR when the signatures HASH and HASH' do not correspond.

As mentioned before, the one or more signature packets HASH_DCF may also be transmitted to one or more of the configuration data clients 112, which in turn provides then the signature HASH, representing in this case configuration data CD' for the signature verification circuit 132, to the signature verification circuit 132.

In the embodiments considered, the two signatures HASH and HASH' are compared directly at a hardware, i.e., by the circuit 132. Additionally or alternatively, the signature values HASH and HASH' may also be provided to the processing unit 102, thereby permitting a software verification of the values. For this purpose, the signature values may be stored in one or more registers addressable by the processing unit 102, so called special-function-registers.

Figure 9:
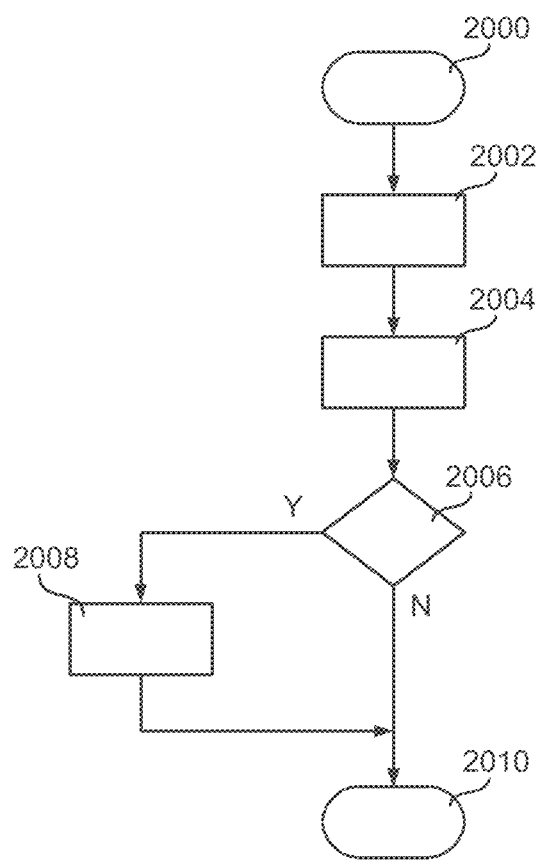
FIG. 9 is a flowchart illustrating a method of operating a processing system in accordance with the present disclosure.

FIG. 9 shows a method of operation a processing system 10a as described before.

Specifically, after a start step 2000, a set of configuration data CD is determined at a step 2002 based on the applications needs, including e.g., calibration data and or security configuration data. Moreover, the respective signature HASH is calculated at the step 2002 and the respective set of configuration data CD including the signature HASH is stored to the non-volatile memory 104 of the processing system 104.

At a following step 2004 the processing system 10a is switched on. Accordingly, the processing system 10a will recalculate via the circuit 130 the signature HASH' based on the data transmitted to the configuration data clients 112 and the circuit 132 will compare the signature HASH' with the signature HASH, possibly generating the error signal ERR (e.g. by setting the error signal ERR to high).

Accordingly, by monitoring the error signal ERR at a step 2006, the method may detect an incorrect behavior during the reading of the configuration data CD.

For example, in case an error is detected (output "Y" of the verification step 2006), one or more operations may be performed at a step 2008 and the method ends at a stop step 2010. The operations at the step 2008 may include, e.g., reprogramming the configuration data, activating a test function of the memory 104 or other blocks of the system, resetting the whole micro-controller, etc.

Conversely, in case no error is detected (output "N" of the verification step 2006), the method ends directly at the step 2010.

In various embodiments, the signature verification circuit 132 may also take into account the life cycle stage of the processing system 10a.

Figure 10:
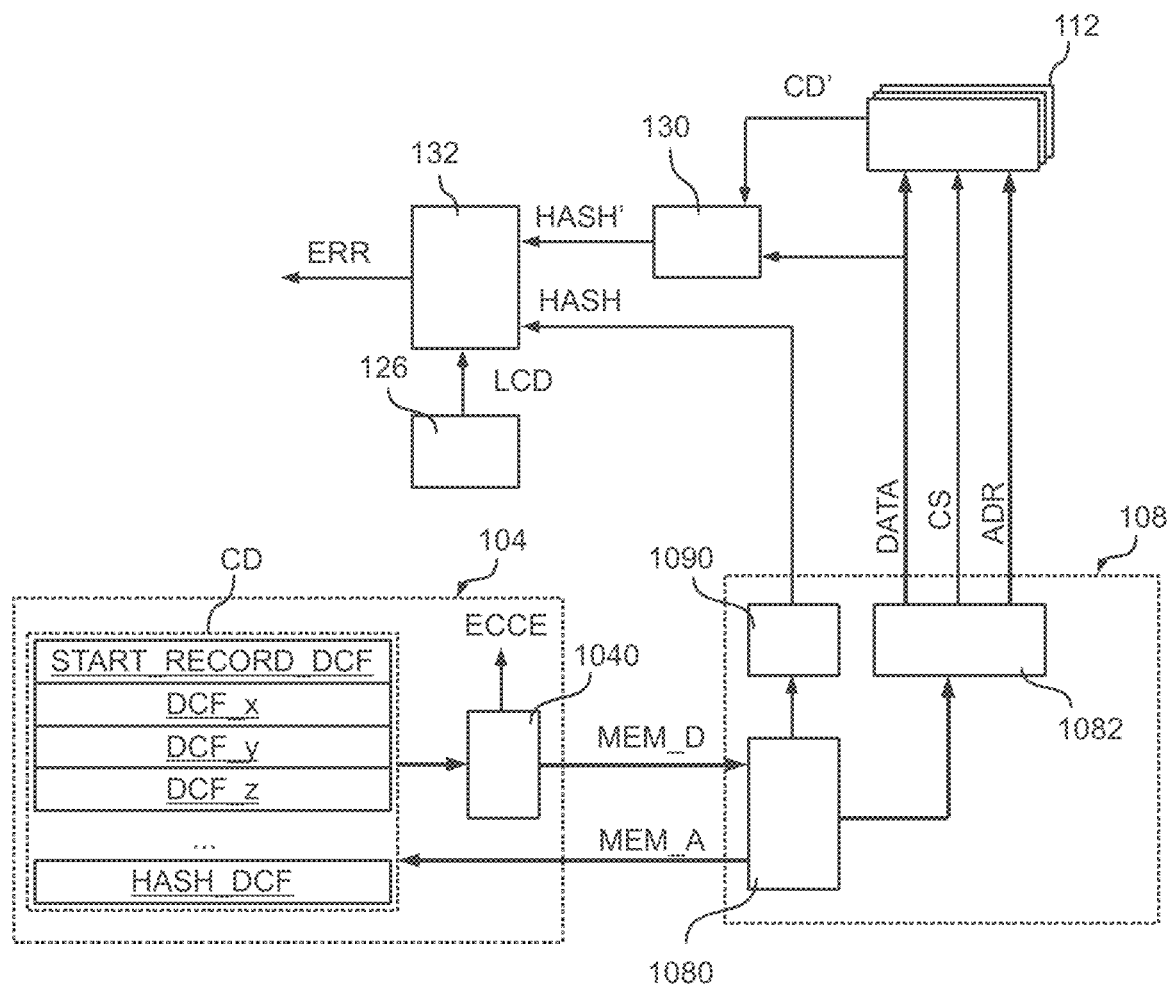
FIG. 10 shows an embodiment of a processing system which takes into account life cycle data during the signature verification.

For example, FIG. 10 shows the exemplary embodiment of FIG. 7, wherein an addition block providing life cycle data LCD has been added. Specifically, the life cycle data LCD indicate the life cycle of the product. The life cycle is a permanent signature written into a non-volatile memory, which determines the stage of the processing system 10a during its life-time. For example, the life cycle may be encoded with a bit sequence. In the embodiment considered, this bit sequence is stored in a separate non-volatile memory 126, preferably a one-time programmable memory. In general, the life cycle data LCD may also be stored at reserved memory locations of the memory 104.

For example, in various embodiments, the bit sequence LCD stored in the memory 126 may indicate one of the following stages:

"production" (LC1), when the processing system 10a, e.g., a micro-controller, is in the chip fabric;

"customer delivery" (LC2), when the processing system 10a has been shipped to the 1st tier customer (e.g., a producer of an engine control unit);

"OEM production" (LC3), when the device has been shipped to a next-level customer (e.g., a car maker);

"in field" (LC4), when the device is installed in the final product (e.g. in a car sold in the market); or "failure analysis" (LC5), when the device is shipped back to producer of the processing system 10a or the software developer for diagnostic purposes.

In various embodiments, the life cycle data LCD is written such that once a certain stage is reached, it is not possible to revert it back to a previous stage, i.e., the life cycle can only advance. For example, this may be implemented with a one-hot encoding in which a fuse is burned each time a given stage has been reached. For example, the advancing of the life cycle to the next stage may be done by the entity who owns the device in the current life cycle stage (e.g., chip producer will advance the life cycle when it is shipped to the customer delivery stage; the 1st tier customer will advance the life cycle when it is shipped to the OEM production stage, etc.).

Accordingly, in this case, the signature verification circuit 132 may by selectively activated or deactivated as a function of the life cycle data LCD. For example, the hardware comparison within the circuit 132 may be activated only when the life cycle indicated by the life cycle data LCD is set to "OEM production" (LC3) or "in field" (LC4) stage, because in other stages the error signal ERR may prevent the testability of the processing system 10a.

The solutions described in the foregoing have thus the advantage that the processing system 10a is able to verify that the configuration data CD stored in the memory 104 (which as mentioned in the foregoing may include plural sets possibly programmed both by the producer and the customer) are correctly read when the processing system 10a is switched on.

For example, as mentioned before, incorrect configuration data may be transmitted or some configuration data may not be transmitted at all due to run-time faults altering the address bus MEM_A. In the solutions described, such address failures may thus be detected without having to use complex data exchange protocols, such as end-to-end error correction (e2eECC) between the non-volatile memory 104 and the configuration data clients.

Of course, without prejudice to the principle of the invention, the details of construction and the embodiments may vary widely with respect to what has been described and illustrated herein purely by way of example, without thereby departing from the scope of the present invention.

What is claimed is:

1. A method, comprising:
    receiving, by each configuration data client in a plurality of configuration data clients, a respective first configuration data addressed to an address of the each configuration data client;
    storing, by the each configuration data client, the respective first configuration data in a register of the each configuration data client;
    changing an operation of a hardware block coupled to at least one of the plurality of configuration data clients, the changing the operation being a function of the respective first configuration data stored in the register of the each configuration data client;
    sequentially reading, by a hardware configuration circuit, data packets from a non-volatile memory comprising second configuration data, wherein the second configuration data are stored as sequential data packets comprising the respective first configuration data and an attribute field identifying the address of the each configuration data client; and
    sequentially transmitting, by the hardware configuration circuit, the respective first configuration data read from the non-volatile memory to the each configuration data client.

2. The method of claim 1, wherein the non-volatile memory comprises a first signature data, and wherein the hardware configuration circuit is configured to read the first signature data from the non-volatile memory.

3. The method of claim 2, further comprising:
    calculating, by a signature calculation circuit, a second signature data as a function of the respective first configuration data transmitted to the each configuration data client or stored in the register of the each configuration data client; and
    comparing, by a signature verification circuit, the first signature data read from the non-volatile memory with the second signature data calculated by the signature calculation circuit; and
    generating, by the signature verification circuit, an error signal in response to the first signature data and the second signature data not corresponding with each other.

4. The method of claim 3, wherein the first signature data is stored with the second configuration data in the non-volatile memory as one or more second data packets.

5. The method of claim 3, wherein the signature calculation circuit is associated with at least one configuration data client of the plurality of configuration data clients, and wherein the first signature data is stored in the non-volatile memory as the second configuration data, the first signature data comprising one or more second data packets comprising an attribute field identifying the address of at least one configuration data client associated with the signature calculation circuit.

6. The method of claim 3, wherein the second configuration data comprises a plurality of sets of second configuration data, wherein the non-volatile memory is configured to store the plurality of sets of second configuration data, wherein a respective first signature data is stored for each set of second configuration data, and wherein the signature calculation circuit is configured to calculate a respective second signature data for the second configuration data of each set of second configuration data.

7. The method of claim 3, further comprising transmitting, by the each configuration data client, the respective first configuration data to the signature calculation circuit in response to receiving the respective first configuration data.

8. The method of claim 3, wherein the hardware configuration circuit and the plurality of configuration data clients are connected through a common data bus.

9. The method of claim 8, further comprising monitoring, by the signature calculation circuit, data transmitted on the common data bus.

10. The method of claim 3, further comprising:
    calculating, by the signature calculation circuit, the second signature data with a hashing function; or
    calculating, by the signature calculation circuit, the second signature data by encoding or encrypting the respective first configuration data to generate encoded or encrypted data and selecting a subset of the encoded or encrypted data.

11. The method of claim 10, wherein the hashing function comprises an MD5 hash or a Secure Hash Algorithm hash.

12. The method of claim 10, wherein the encoding or encrypting comprises encoding or encrypting according to an Advanced Encryption Standard or a Data Encryption Standard.

13. The method of claim 10, further comprising generating, by the signature verification circuit, the error signal taking into account life-cycle data stored in a one-time programmable memory.

14. A method, comprising:
    receiving, by a configuration data client, a first configuration data addressed to an address of the configuration data client;
    storing, by the configuration data client, the first configuration data in a register of the configuration data client;
    changing an operation of a hardware block coupled to the configuration data client, the changing the operation being a function of the first configuration data stored;
    sequentially reading, by a hardware configuration circuit, data packets from a non-volatile memory comprising second configuration data, wherein the second configuration data are sequentially stored as data packets comprising the first configuration data and an attribute field identifying the address of the configuration data client; and sequentially transmitting, by the hardware configuration circuit, the first configuration data read from the non-volatile memory to the configuration data client.

15. The method of claim 14, wherein the configuration data client, the hardware block, the hardware configuration circuit, and the non-volatile memory are components of an integrated circuit.

16. The method of claim 15, wherein the integrated circuit is a microcontroller.

17. A method, comprising:
receiving a respective first configuration data addressed to an address of each configuration data client in a processing system of a vehicle;
storing the respective first configuration data in a register of the each configuration data client;
changing an operation of a hardware block coupled to at least one configuration data client in the processing system, the changing the operation being a function of the respective first configuration data stored in the register of the each configuration data client;
sequentially reading, by a hardware configuration circuit, data packets from a non-volatile memory comprising second configuration data, wherein the second configuration data are sequentially stored as data packets comprising the respective first configuration data and an attribute field identifying the address of the each configuration data client; and
sequentially transmitting the respective first configuration data read from the non-volatile memory to the each configuration data client.

18. The method of claim 17, further comprising reading, by the hardware configuration circuit, a first signature data stored in the non-volatile memory.

19. The method of claim 18, further comprising:
calculating, by a signature calculation circuit, a second signature data as a function of the respective first configuration data transmitted to the each configuration data client or stored in the register of the each configuration data client; and
comparing, by a signature verification circuit, the first signature data read from the non-volatile memory with the second signature data calculated by the signature calculation circuit; and
generating, by the signature verification circuit, an error signal in response to the first signature data and the second signature data not corresponding with each other.

20. The method of claim 18, wherein the first signature data is stored with the second configuration data in the non-volatile memory as one or more second data packets.

* * * * *

UNITED STATES PATENT AND TRADEMARK OFFICE
CERTIFICATE OF CORRECTION

PATENT NO. : 11,822,934 B2
APPLICATION NO. : 17/341054
DATED : November 21, 2023
INVENTOR(S) : Colombo et al.

It is certified that error appears in the above-identified patent and that said Letters Patent is hereby corrected as shown below:

On the Title Page

Item (73), in Column 1, in "Assignees", Line 4, after "N.V.," delete "Germany".

Signed and Sealed this
Twentieth Day of February, 2024

Katherine Kelly Vidal
*Director of the United States Patent and Trademark Office*